United States Patent
Chen

(10) Patent No.: US 7,921,753 B2
(45) Date of Patent: Apr. 12, 2011

(54) SCREW LOCKING TOOL

(76) Inventor: Ho-Tien Chen, Tainan (TW)

( * ) Notice: Subject to any disclaimer, the term of this patent is extended or adjusted under 35 U.S.C. 154(b) by 175 days.

(21) Appl. No.: 12/431,635

(22) Filed: Apr. 28, 2009

(65) Prior Publication Data

US 2010/0269641 A1   Oct. 28, 2010

(51) Int. Cl.
*B25B 23/10* (2006.01)
(52) U.S. Cl. .......................... 81/444; 81/451
(58) Field of Classification Search .......... 81/441–444, 81/451, 176.15, 121.1, 125
See application file for complete search history.

(56) References Cited

U.S. PATENT DOCUMENTS

| | | | | |
|---|---|---|---|---|
| 4,140,161 A * | 2/1979 | Russo et al. | | 81/451 |
| 4,938,108 A * | 7/1990 | Mekler | | 81/176.15 |
| 5,207,127 A * | 5/1993 | Nick | | 81/54 |
| 5,341,708 A * | 8/1994 | Nick | | 81/451 |
| 5,509,330 A * | 4/1996 | Nick | | 81/55 |
| 6,155,145 A * | 12/2000 | Oh et al. | | 81/451 |
| 6,240,811 B1 | 6/2001 | Oesterle et al. | | |
| 6,324,946 B1 | 12/2001 | Gasser et al. | | |
| 6,539,826 B2 | 4/2003 | Oesterle et al. | | |
| 7,237,464 B2 * | 7/2007 | Mekler | | 81/441 |
| 2002/0166421 A1 * | 11/2002 | Bowerman | | 81/451 |
| 2006/0278050 A1 * | 12/2006 | Hsiao | | 81/451 |

* cited by examiner

*Primary Examiner* — David B Thomas
(74) *Attorney, Agent, or Firm* — J.C. Patents

(57) ABSTRACT

A screw locking tool includes a main body composed of a shank to be combined with a hand tool and a sleeve. The shank has front end continually connected with the sleeve having its surface disposed with an annular recess with an O-shaped ring fitted therein and bored with insert holes communicating with an accommodating cavity of the sleeve for receiving positioning steel balls, with an elastic element fixed in the accommodating cavity. A screwing element secured with the accommodating cavity has a shank with a minor-diameter and a medium-diameter annular recess for receiving steel balls to prevent the screwing element from slipping off. A receiving groove at the front end of the screwing element is bored with insert holes respectively for fitting a positioning steel ball and has an annular recess fitted therein with an O-shaped ring for positioning the steel balls.

10 Claims, 6 Drawing Sheets

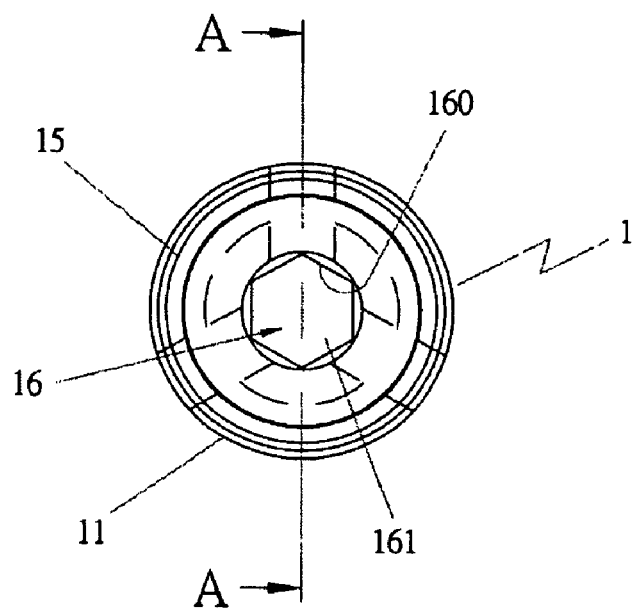
FIG 3
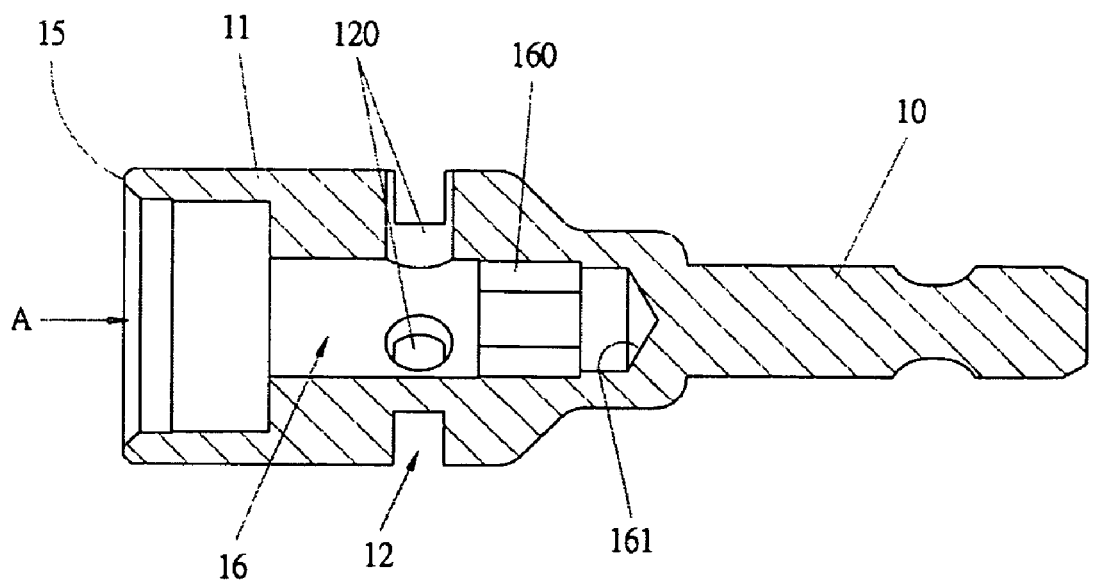
FIG 4 (A-A)

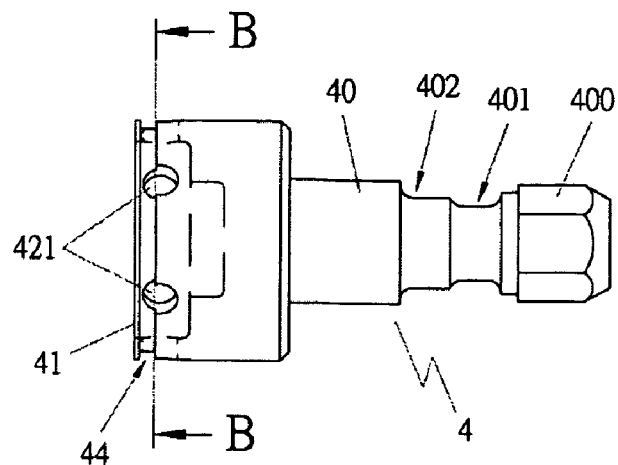
FIG 5
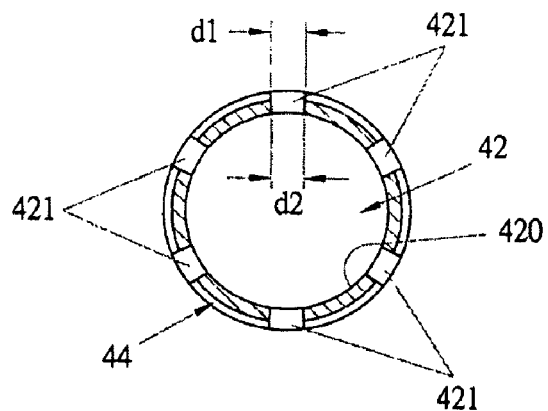
FIG 6 (B-B)
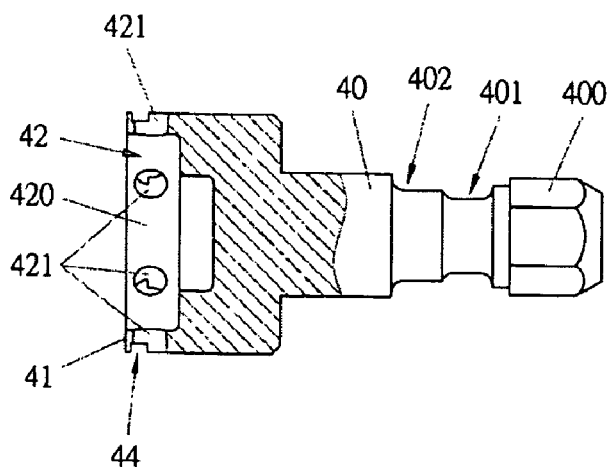
FIG 7

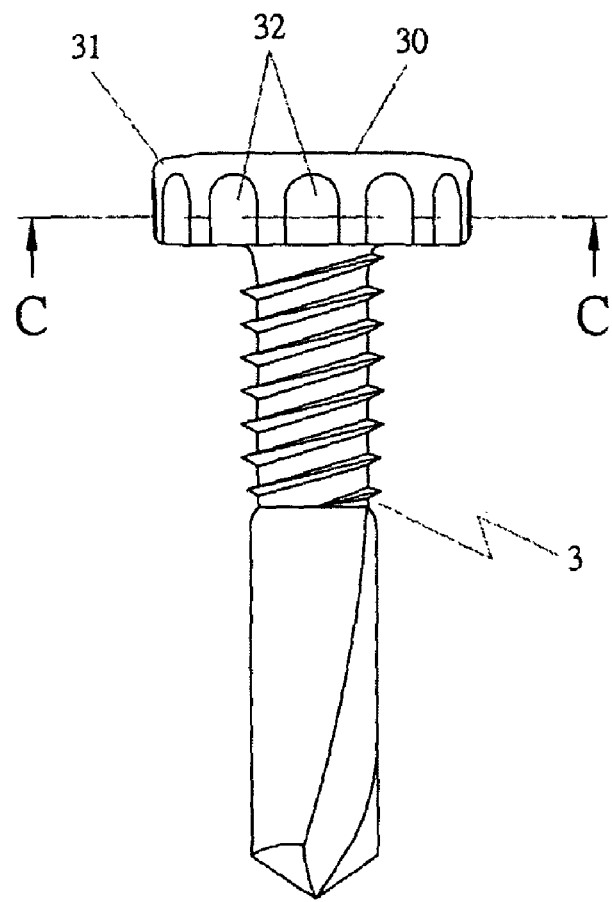
FIG 12
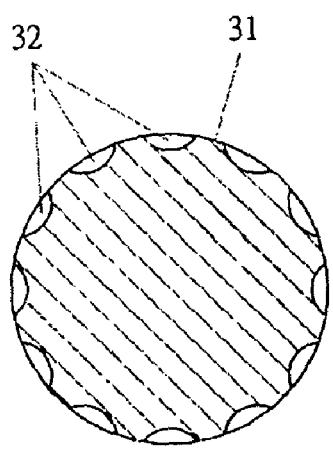
FIG 13 (C-C)
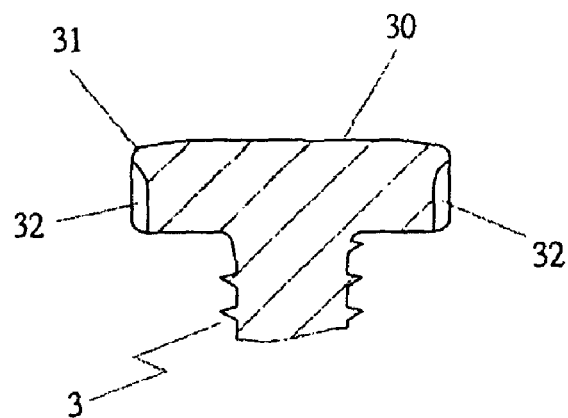
FIG 14

SCREW LOCKING TOOL

BACKGROUND OF THE INVENTION

1. Field of the Invention

This invention relates to a screw locking tool, particularly to one including a main body and a screwing element fixed in the accommodating cavity of the main body. When the head of a screw is combined with the receiving groove of the screwing element, the positioning steel balls of the screwing element will be respectively engaged in the side recessed slots of the screw head, and the O-shaped ring of the screwing element will properly push against the positioning steel balls, thus enabling the screwing element to stably fix the screw in place. By so designing, it is needless to provide any magnetic element for attracting and fixing a screw, and before being locked into a work piece, the screw will not slip off, able to carry out screw locking work conveniently, quickly and safely.

2. Description of the Prior Art

One conventional screw locking tool, as disclosed in one U.S. Pat. No. 6,240,811 B1 or in another U.S. Pat. No. 6,539,826 B2, includes a screwing element provided with a clamping jaws 3, 4 disposed in the interior of a holder 2 and respectively formed with an incision 15.16 for clamping the head of a fastener 16. However, the conventional screw locking tool must be provided with clamping jaws for clamping and holding the head of a fastener, complicated in structure and high in manufacturing cost. Such a conventional screw locking tool has the following defects.

1. The clamping jaws of the screwing element are likely to be actuated to contract into the interior of the holder by a little force even if the clamping jaws does not yet clamp a fastener, and in this case, the clamping jaws of the screwing element have to be hooked out by another tool or by the head of a fastener, troublesome in use.

2. The clamping jaws are easy to accumulate iron filings and cause trouble.

Another conventional screw locking tool disclosed in a U.S. Pat. No. 6,324,946 B1, titled "Screwdriver adapter", includes an adapter 1 provided with a receiving element 3 that is a nut-shaped element 2. The nut-shaped element 2 is disposed with a holding element 15 at a corresponding location of a tool driving means 6 and a resilient element 6. However, such a conventional screw locking tool has to be provided with the tool driving means 6 as a drive portion 18 for driving a screw, and after the screw is locked into a work piece, the drive portion 18 will become excessively lofty and exposed out of the outer surface of the work piece, leaving too many projections on the surface of the work piece.

SUMMARY OF THE INVENTION

The objective of this invention is to offer a screw locking tool, including a main body provided with a screwing element for fixing a screw in advance before the screw is locked into a work piece. Thus, when combined with the receiving groove of the screwing element, the screw can completely be fixed in place not to slip off, needless to provide any magnetic element for attracting and fixing a screw, and able to carry out screw locking work conveniently, quickly and safely.

The main body of the screw locking tool of this invention has a sleeve disposed with an annular recess fitted therein with an O-shaped ring. The annular recess is bored with plural insert holes respectively having a positioning steel ball fixed therein for preventing the screwing element from slipping off the accommodating cavity of the sleeve.

The screwing element of the screw locking tool of this invention is formed with a receiving groove for receiving the head of a screw. The receiving groove has its side wall bored with a plurality of insert holes respectively for fixing a positioning steel ball therein. Further, the receiving groove a has side wall disposed with an annular recess fitted therein with an O-shaped ring, which functions to fix the positioning steel balls in place and act as a buffer element for the positioning steel balls.

The screw locking tool of this invention can easily combine a screw head together with the receiving groove of the screwing element, By having the positioning steel balls of the screwing element properly pushed by the O-shaped ring and respectively engaged in the side recessed slots of the screw head, the screw, before being locked into a work piece, will not slip off the receiving groove of the screwing element, needless to provide any magnetic element for attracting and fixing a screw and able to carry out screw locking work conveniently, quickly and safely.

BRIEF DESCRIPTION OF DRAWINGS

This invention will be better understood by referring to the accompanying drawings, wherein:

FIG. 3 is a front view of the main body of the screw locking tool in the present invention;

FIG. 4 is a cross-sectional view of the line A-A in FIG. 3;

FIG. 5 is a side view of a screwing element of the screw locking tool in the present invention;

FIG. 6 is a cross-sectional view of the line B-B in FIG. 5;

FIG. 7 is a cross-sectional view of the screwing element of the screw locking tool in the present invention;

FIG. 12 is a front view of a certain kind of screw matching with the screw locking tool in the present invention;

FIG. 13 is a cross-sectional view of the line C-C in FIG. 12; and

FIG. 14 is a partial cross-sectional view of the certain kind of screw matching with the screw locking tool in the present invention.

DETAILED DESCRIPTION OF THE PREFERRED EMBODIMENT

A preferred embodiment of a screw locking tool in the present invention, as shown in FIGS. 1-4, includes a main body 1 provided with a shank 10 to be combined with an external hand tool, and a sleeve 11 located to continually connected with the front end of the shank 10.

Figure 2:
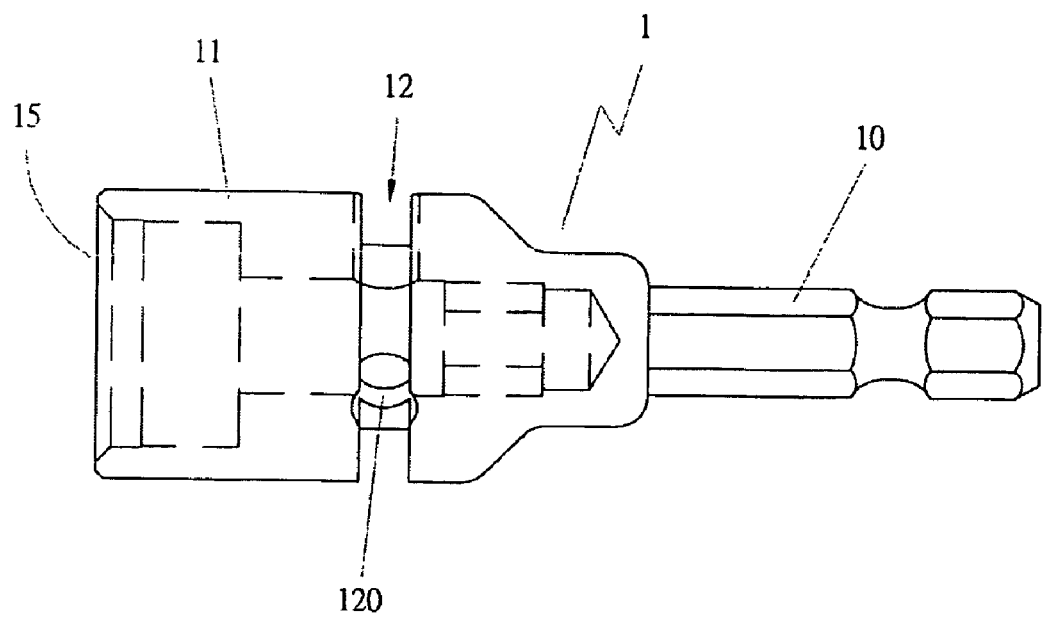
FIG. 2 is a side view of a main body of the screw locking tool in the present invention.

Referring to FIGS. 2 and 4, the sleeve 11 is provided with an accommodating cavity 16 in a central interior axially and an annular recess 12 in the outer surface for fitting an O-shaped ring 13 therein, which is made of rubber, silica gel or plastic with proper elasticity and hence, when fitted around the annular recess 12, the O-shaped ring 13 can be tightly fitted on the surface of the annular recess 12 by its own elasticity. Further, the annular recess 12 is bored with plural insert holes 120 communicating with the accommodating cavity for receiving positioning steel balls 14 therein. The O-shaped ring 13 functions to restrict the moving distance of the positioning steel balls 14 and prevent the positioning steel balls 14 from slipping off the annular recess 12.

Figure 1:
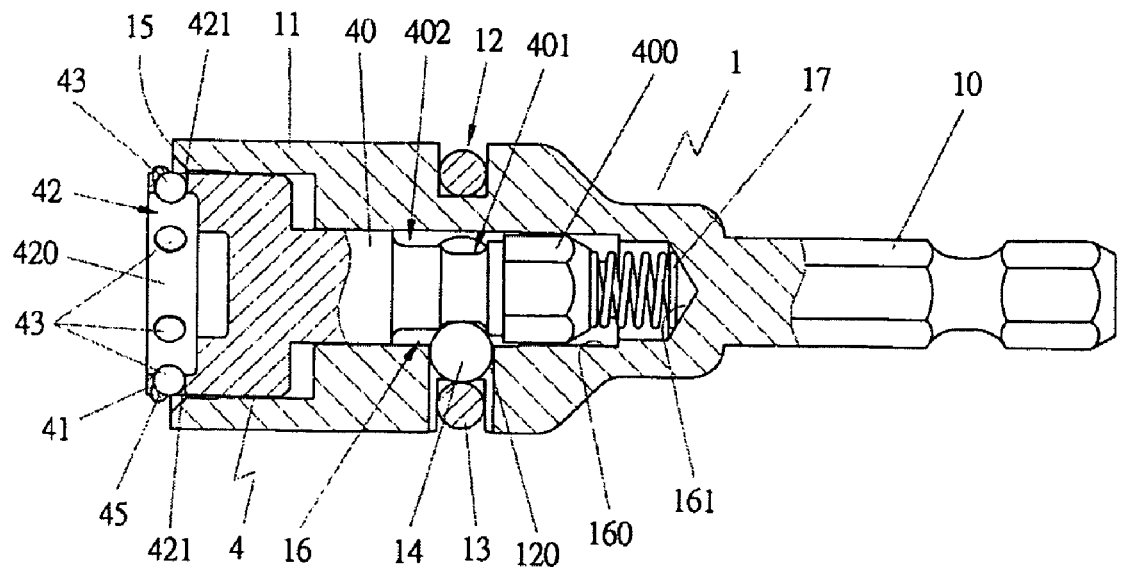
FIG. 1 is a cross-sectional view of a screw locking tool in the present invention.

Referring to FIGS. 1 and 4, the accommodating cavity 16 of the sleeve 11 extends from its front side to the interior and having a shape matching with the shape of a screwing element 4, as shown by the arrowhead (A) in FIG. 4. The accommodating cavity 16 has its innermost side formed with a polygonal annular wall 160 with the same shape as the polygonal combining member 400 of a shank 40 of the screwing element 4. The screwing element 4 is received in the accommodating cavity 16 of the sleeve 11, and an elastic element 17 is disposed at the innermost side of the accommodating cavity 16, having one end pushing the inner wall 161 of the accommodating cavity 16 and the other end resisting against the outer end of the shank 40 of the screwing element 4. Thus, the screwing element 4 will always be pushed by the elastic element 17 in the accommodating cavity 16 of the sleeve 11 and kept in an extended-out condition. Thus, even if pressed by external force, the screwing element 4 will be pushed to recover its original position by the elastic member 17. In other words, the screwing element 4 will never be stuck in the accommodating cavity 16 of the main body 1 in case of being moved inward instantly.

Referring to FIG. 1, the screwing element 4 is received in the accommodating cavity 16 of the sleeve 11. As mentioned above, the accommodating cavity 16 of the sleeve 11 has the same shape as the screwing element 4 so they can be fully combined together tightly.

The screwing element 4, as shown in FIGS. 5, 6 and 7, is provided with the shank 40 formed with the polygonal combining member 400 to be combined with the polygonal annular wall 160 of the accommodating cavity 16 of the sleeve 11 so that the main body 1 can drive the screwing element 4 to operate.

Further, referring to FIG. 7, the shank 40 of the screwing element 4 is disposed with a minor-diameter annular recess 401 and a medium-diameter annular recess 402 for matching with the operation of the positioning steel balls 14 of the sleeve 11, as shown in FIG. 1. Ordinarily, the screwing element 4 is pushed by the elastic element 17 and kept in an extended-out condition; therefore, the positioning steel balls 14 are located at the minor-diameter annular recess 401, thus able to prevent the screwing element 4 from slipping off the accommodating cavity 16 of the sleeve 11.

Figure 10:
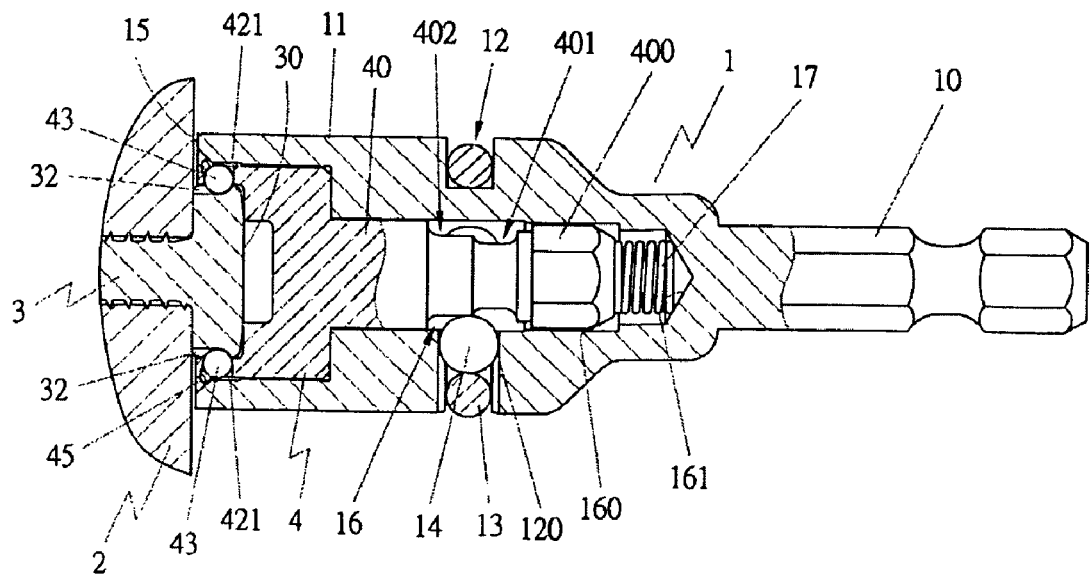
FIG. 10 is a cross-sectional view of a screw being locked into a work piece by means of the screw locking tool in the present invention.

Referring to FIG. 10, when the screw locking tool is pressed forward to lock a screw 3 into a work piece 2, the work piece 2 combined with the screw 3 will produce a resistance to the screw locking tool to actuate the screwing element 4 to move backward and press the elastic element 17, letting the positioning steel balls 14 disengage from the minor-diameter annular recess 401 temporarily and moved to the medium-diameter annular recess 402.

Figure 11:
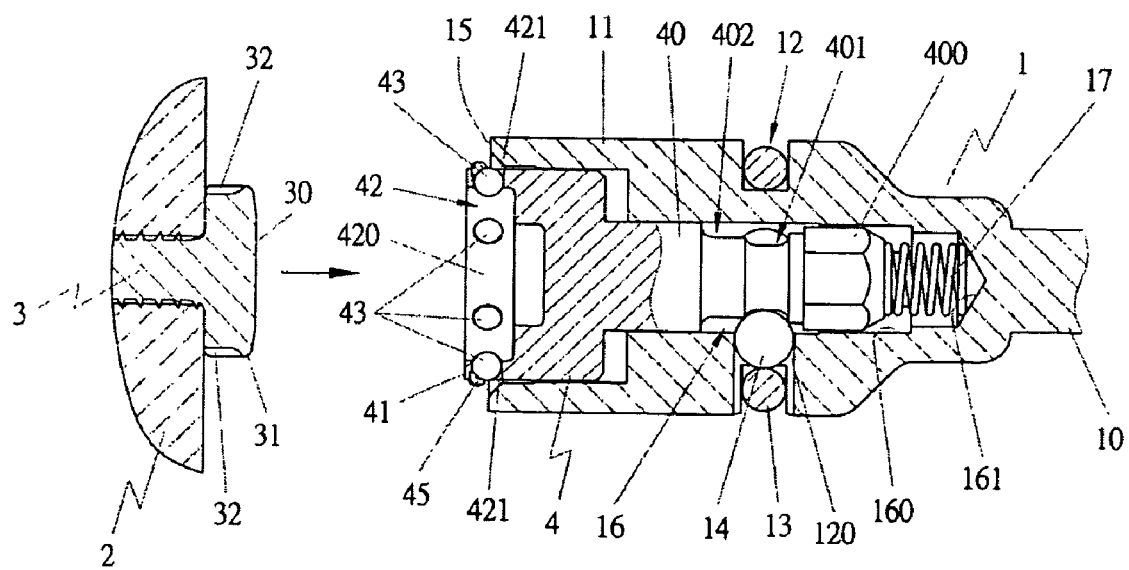
FIG. 11 is cross-sectional view of the screw locked into a work piece by means of the screw locking tool in the present invention.

As shown in FIG. 11, after the screw 3 is locked into the work piece 2 and the screw locking tool is withdrawn, the screwing element 4 will be pushed by the elastic element 17 to recover its original position and located at the minor-diameter annular recess 401 to be prevented from slipping off the accommodating cavity 16 of the sleeve 11.

Referring to FIGS. 5, 6 and 7, the screwing element 4 is formed with a receiving groove 42 extending from its front side toward the interior and having its annular wall 420 bored with a plurality of insert holes 421 in oblique shape. The diameter (d1) of the outer opening of each insert hole 421 is larger than the diameter (d2) of the inner opening, and the diameter (d2) of the inner opening of each insert hole 421 is smaller than the diameter of each positioning steel ball 43 so as to prevent the positioning steel ball 43 from slipping off the receiving groove 42 of the screwing element 4.

Referring to FIGS. 1 and 5, the receiving groove 42 has the insert holes 421 respectively receiving the positioning steel balls 43 and has its annular wall 420 formed with an annular recess 44, with a part of each insert hole 421 extending to the annular recess 44. The annular recess 44 is fitted therein with an O-shaped ring 45 made of rubber, silica gel or plastic with proper elasticity; therefore, when fitted around the annular recess 44, the O-shaped ring 45 can be tightly fitted on the surface of the annular recess 44 by its own elasticity, acting as an elastic and positioning medium for the positioning steel balls 43.

Referring to FIG. 1, when the receiving groove 42 of the screwing element 4 is not yet combined with a screw head 30, the positioning steel balls 43 disposed on the annular wall 420 of the receiving groove 42 will be pressed toward the interior of the receiving groove 42 and fixed in place by the elastic force of the O-shaped ring 45.

Figure 8:
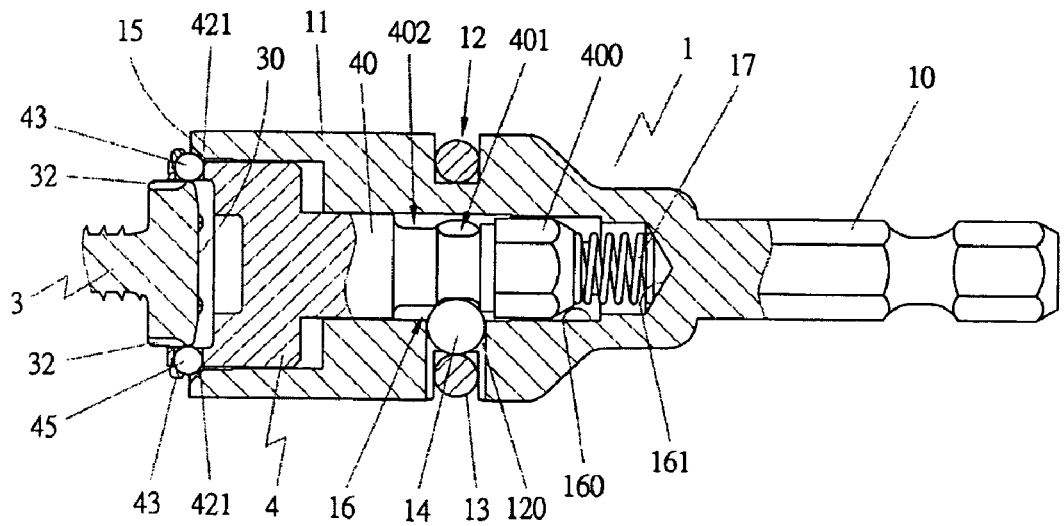
FIG. 8 is a cross-sectional view of the screw locking tool and a screw being combined with the receiving groove of the screwing element in the present invention.

The instant when the receiving groove 42 of the screwing element 4 is to be combined with the screw head 30, in other words, before the screw head 30 is completely received in the receiving groove 42, as shown in FIG. 8, the edge of the upper annular wall 31 of the screw head 30 will first touch the positioning steel balls 43 and instantly push the positioning steel balls 43 to move outward (It means to move toward the outer side of the annular wall 420 of the receiving groove 42). Simultaneously, the positioning steel balls 43 will be moved outward to press the O-shape ring 45 but will never slip off the annular recess 44 because they are respectively positioned in the oblique insert holes 421 and restricted not to move outward by the O-shaped ring 45.

Figure 9:
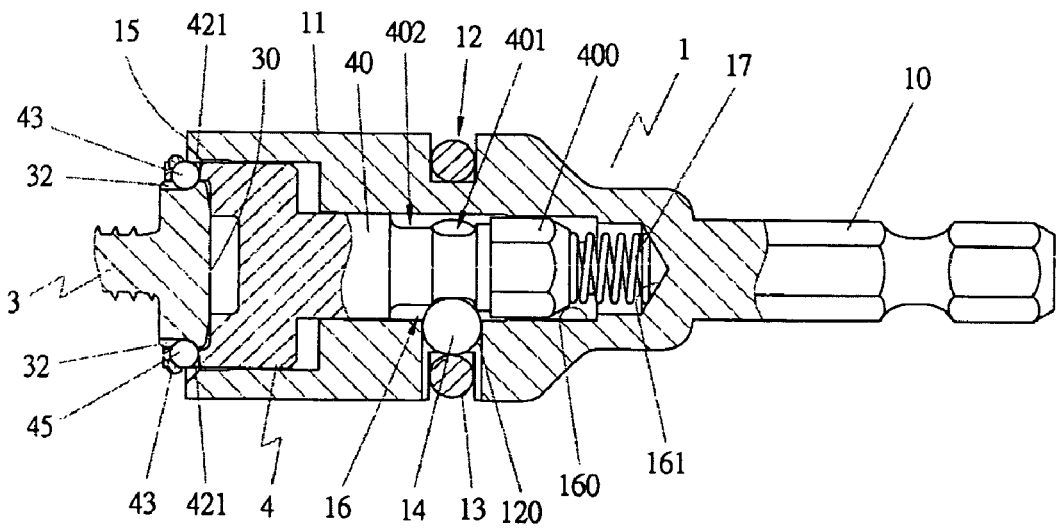
FIG. 9 is a cross-sectional view of the screw locking tool and the screw already combined with the receiving groove of the screwing element in the present invention.

After the receiving groove 42 of the screwing element 4 is completely combined with the screw head 30, as shown in FIG. 9, the upper annular wall 31 of the screw head 30 will be moved to the rear side of the positioning steel balls 43. When the screw head 30 is moved inward toward the receiving groove 42, the positioning steel balls 43 will be actuated and respectively stuck in plural recessed slots 32 at the outer circumference of the screw head 30 to combine the screw and the screwing element 4 together. Thus, a screw can quickly and conveniently be combined with the screwing element of the screw locking tool of this invention and will never slip off, needless to provide any magnetic element for attracting and fixing the screw, able to carry out screw locking work safely and quickly.

Referring to FIG. 10, when a user operates the screw locking tool to lock a screw 3 into a work piece 2, the screw head 30 is completely combined with the receiving groove 42 of the screwing element 4 and the positioning steel balls 43 are respectively engaged in the recessed slots 32 of the screw 3; therefore, the screw 3 can quickly and smoothly be locked into the work piece by the screw locking tool.

As shown in FIG. 11, after the screw 3 is locked into the work piece 2, and the screw locking tool is withdrawn, the head 30 of the screw 3 is still kept on the outer surface of the work piece 2; therefore, only by the screw locking tool of this invention, can the screw 3 be removed from the work piece 2.

Thus, after locked into the work piece 2, the screw can be kept safe and will never be loosened off without using the screw locking tool of the invention.

FIGS. 12, 13 and 14 show a kind of screw 3 that matches with the screw locking tool of this invention. The screw 3 is formed with a screw head 30 provided with an upper annular wall 31 and a plurality of recessed slots 32 located under the upper annular wall 31. Nevertheless, the screw locking tool of this invention is not confined to adapt to this kind of screw 3 only, the screw locking tool of this invention can also be applicable to other kinds of screws with different external appearances by changing the shape of the receiving groove 42 of the screwing element 4.

While the preferred embodiment of the invention has been described above, it will be recognized and understood that various modifications may be made therein and the appended claims are intended to cover all such modifications that may fall within the spirit and scope of the invention.

I claim:

1. A screw locking tool comprising
    a main body provided with a shank and a sleeve, said shank having front end continually connected with said sleeve, said sleeve formed with a central accommodating cavity axially formed in an interior and an annular recess fitted therein with an O-shape ring, said annular recess bored with insert holes communicating with said accommodating cavity, each said insert hole having a positioning steel ball fixed therein, said accommodating cavity having an elastic element disposed therein;
    a screwing element received in said accommodating cavity of said sleeve, said screwing element formed with a shank, said shank disposed with an annular recess for matching with operation of said positioning steel balls of said sleeve, said screwing element provided with a receiving groove for receiving a screw head, said receiving groove having an annular wall bored with insert holes respectively for fixing a positioning steel ball therein, said annular wall of said receiving groove disposed with an annular recess fitted therein with an O-shaped ring, said O-shaped ring restricting a moving distance of said positioning steel balls and preventing metal filings from being accumulated in said accommodating cavity of said sleeve; and
    said positioning steel balls in said receiving groove of said screwing element respectively engaged in recessed slots of a screw head when said screw head is combined with said receiving groove of said screwing element, said screwing element able to completely fix a screw in place to let said screw not slip off.

2. The screw locking tool as claimed in claim 1, wherein said O-shaped ring is made of rubber with elasticity.

3. The screw locking tool as claimed in claim 2, wherein said accommodating cavity of said sleeve is provided with an elastic element in an interior for pushing against said screwing element so as to keep said screwing element in an extended-out condition.

4. The screw locking tool as claimed in claim 1, wherein said O-shaped ring is made of silica gel with elasticity.

5. The screw locking tool as claimed in claim 1, wherein said O-shaped ring is made of plastic with elasticity.

6. The screw locking tool as claimed in claim 1, wherein said accommodating cavity of said sleeve has an innermost side formed with a polygonal annular wall with the same shape as a polygonal combining member of said shank of said screwing element.

7. The screw locking tool as claimed in claim 1, wherein said shank of said screwing element is disposed with a minor-diameter annular recess and a medium-diameter annular recess for matching with operation of said positioning steel balls of said main body, said positioning steel balls of said sleeve able to prevent said screwing element from slipping off said accommodating cavity of said main body.

8. The screw locking tool as claimed in claim 1, wherein said receiving groove of said screwing element is bored with a plurality of insert holes respectively formed in an oblique shape, that is, a diameter (d1) of outer opening is larger than a diameter (d2) of inner opening, and said diameter (d2) of said inner opening is smaller than the diameter of said positioning steel ball, able to prevent said positioning steel balls from slipping off said receiving groove of said screwing element.

9. The screw locking tool as claimed in claim 1, wherein said accommodating cavity of said sleeve is provided with an elastic element in an interior for pushing against said screwing element so as to keep said screwing element in an extended-out condition.

10. A screw locking tool comprising:
    a main body provided with a shank and a sleeve, said shank having front end continually connected to said sleeve, said sleeve formed with an accommodating cavity in a central interior axially, and an insert holes communicating with said accommodating cavity, said insert holes respectively fixed therein with a positioning steel ball, said accommodating cavity having an elastic element set therein;
    a screwing element received in said accommodating cavity of said sleeve, said screwing element provided with a shank, said shank disposed with an annular recess for matching with operation of said positioning steel balls of said sleeve, said screwing element formed with a receiving groove for receiving a head of a screw, said receiving groove having annular wall bored with a plurality of insert holes respectively for fixing a positioning steel ball, said annular wall of said receiving groove provided with an annular recess fitted therein with an O-shaped ring for restricting a moving distance of said positioning steel balls;
    a screw provided with a head, said head of said screw disposed with an upper annular wall and a plurality of recessed slots located under said upper annular wall; and
    said positioning steel balls in said receiving groove of said screwing element respectively engaged in said recessed slots of said screw head when said screw head is combined with said receiving groove of said screwing element, said screwing element able to fully fix said screw in place to let said screw not slip off, facilitating to carry out screw locking work.

* * * * *